(12) United States Patent
Fukuoka

(10) Patent No.: US 8,004,132 B2
(45) Date of Patent: Aug. 23, 2011

(54) CORELESS MOTOR

(75) Inventor: Ryuusei Fukuoka, Hirosaki (JP)

(73) Assignees: Canon Kabushiki Kaisha, Tokyo (JP); Canon Precision Inc., Aomori (JP)

(*) Notice: Subject to any disclaimer, the term of this patent is extended or adjusted under 35 U.S.C. 154(b) by 281 days.

(21) Appl. No.: 12/464,313

(22) Filed: May 12, 2009

(65) Prior Publication Data

US 2009/0289514 A1    Nov. 26, 2009

(30) Foreign Application Priority Data

May 20, 2008  (JP) ................................. 2008-131737

(51) Int. Cl.
  *H02K 7/116*  (2006.01)
  *H02K 23/58*  (2006.01)
(52) U.S. Cl. ......................................................... 310/83
(58) Field of Classification Search .................... 396/75; 310/40 MM, 81, 83
  See application file for complete search history.

(56) References Cited

U.S. PATENT DOCUMENTS

| | | | | |
|---|---|---|---|---|
| 4,567,535 A | * | 1/1986 | Kinjo | 360/87 |
| 4,918,344 A | * | 4/1990 | Chikamori et al. | 310/83 |
| 5,270,602 A | * | 12/1993 | Takehara | 310/198 |
| 6,707,189 B2 | * | 3/2004 | Ito et al. | 310/75 R |
| 7,118,506 B2 | * | 10/2006 | Zheng et al. | 475/18 |

FOREIGN PATENT DOCUMENTS

| JP | 59103556 A | * | 6/1984 |
|---|---|---|---|
| JP | 08-186955 | | 7/1996 |

* cited by examiner

*Primary Examiner* — Burton Mullins
(74) *Attorney, Agent, or Firm* — Cowan, Liebowitz & Latman, P.C.

(57) ABSTRACT

A coreless motor able to be downsized and easy to be assembled and to ensure the concentricity between a motor shaft, a magnet, and an outer cylinder. The coreless motor includes an outer cylinder gear unit having an output shaft and a speed-reducer mechanism incorporated into a field assembly having a magnet fitted on an inner yoke and an outer cylinder fitted on an outer periphery of the magnet, a motor shaft unit having an inner lid rotatably supporting a motor shaft via ball bearings, a rotor unit having a circular plate attached with a commutator electrically connected to a coil, an outer lid unit having an outer lid mounted with brushes. The inner lid is incorporated in the inner yoke, the coil is incorporated in between the outer cylinder and the magnet, and the outer lid unit is attached to the rotor unit and the outer cylinder.

4 Claims, 8 Drawing Sheets

CORELESS MOTOR

BACKGROUND OF THE INVENTION

1. Field of the Invention

The present invention relates to a coreless motor with speed-reducer mechanism.

2. Description of the Related Art

To attain a speed-reduced motor output, a speed-reducer mechanism is generally provided between a motor output shaft and a desired output shaft. The speed-reducer mechanism is disposed outside or inside the motor. Even in the case of speed-reducer mechanisms disposed inside the motor, most of them are merely disposed inside a motor housing, but disposed outside basic motor components such as an armature and a rotor (Japanese Laid-open Patent Publication No. 8-186955).

The advantages of an arrangement having a motor and a gear head (speed-reducer mechanism) both incorporated in the same housing as disclosed in the just-mentioned patent publication are that intermediate component parts can be eliminated, which are required for coupling and positioning the motor and the speed-reducer mechanism when they are constructed independently of each other, and that an operation for positional adjustment of the motor and the speed-reducer mechanism can be eliminated, resulting in a corresponding reduction of man-hour of assembly.

With the arrangement disclosed in Japanese Laid-open Patent Publication No. 8-186955, however, a downsizing of the motor can only slightly be achieved by the one-piece design of the motor and the speed-reducer mechanism. This indicates that a drastic revision including improvement in motor structure is required to achieve a further downsizing of the motor integrated with the speed-reducer mechanism, i.e., to further reduce the entire motor length.

SUMMARY OF THE INVENTION

The present invention provides a coreless motor able to be downsized and easy to ensure the concentricity of a motor shaft, a magnet, and an outer cylinder, thereby offering a structure easy to be assembled.

According to a first aspect of the present invention, there is provided a coreless motor comprising (a) an outer cylinder gear unit including a planetary gear unit, an inner yoke formed with an internal gear in mesh with planetary gears of the planetary gear unit, a cylindrical magnet disposed on an outer periphery of the inner yoke, and an outer cylinder disposed on an outer periphery of the magnet, (b) a motor shaft unit including an inner lid adapted to be attached to the inner yoke, a motor shaft mounted with a pinion gear engageable with the planetary gears of the planetary gear unit when the inner lid is attached to the inner yoke, and a pair of bearings adapted to journal the motor shaft for rotation relative to the inner lid, (c) a rotor unit including a circular plate adapted to be attached to the motor shaft, a commutator attached to the circular plate, and a cylindrical coil fixed to the circular plate and electrically connected with the commutator, and (d) an outer lid unit including an outer lid adapted to be attached to the outer cylinder, and brushes fixed to the outer lid and adapted to be in contact with the commutator when the outer lid is attached to the outer cylinder, wherein the inner lid is attached to the inner yoke such that the pinion gear is in mesh with the planetary gears of the planetary gear unit, the circular plate is then attached to the motor shaft such that the coil is interposed between the magnet and the outer cylinder, and then the outer lid is attached to the outer cylinder.

According to a second aspect of the present invention, there is provided a coreless motor comprising (a) a motor shaft, (b) a pinion gear attached to the motor shaft, (c) a planetary gear unit having planetary gears in mesh with the pinion gear, (d) an inner yoke formed with an internal gear in mesh with the planetary gears of the planetary gear unit, (e) an inner lid fixed to the inner yoke, (f) a pair of bearings adapted to journal the motor shaft on the inner lid, (g) a cylindrical magnet disposed at an outer periphery of the inner yoke, (h) an outer cylinder fixed to the inner yoke and disposed at an outer periphery of the magnet, (i) a coil interposed between the magnet and the outer cylinder and adapted, when energized, to rotate around the motor shaft relative to the magnet, (j) a commutator electrically connected with the coil, (k) a circular plate attached with the commutator and fixed to the coil, (l) brushes disposed in contact with the commutator, and (m) an outer lid attached with the brushes and fixed to the outer cylinder.

According to the present invention, a coreless motor can be provided that is able to be downsized and that has a structure which is easy to be assembled and with which the concentricity between the motor shaft, the magnet, and the outer cylinder can easily be ensured.

Further features of the present invention will become apparent from the following description of an exemplary embodiment with reference to the attached drawings.

DETAILED DESCRIPTION OF THE PREFERRED EMBODIMENT

The present invention will now be described in detail below with reference to the drawings showing a preferred embodiment thereof.

Before describing an embodiment of this invention, a description is given of a coreless motor created by the present inventor on which a coreless motor of this invention is based.

Motors with speed reducer having a motor and a speed-reducer mechanism both disposed in the same housing have been proposed in, e.g., Japanese Laid-open Patent Publication No. 8-186955. However, most of motors of this type merely integrate a motor housing and a speed reducer housing into one. To reduce the entire motor length, the present inventor created a coreless motor with built-in speed reducer having a motor part constituted by a coreless motor and a speed reducer having a housing thereof additionally functioning as an inner yoke of a field magnet. In other words, the speed reducer in this motor is incorporated inside the magnet.

Figure 7:
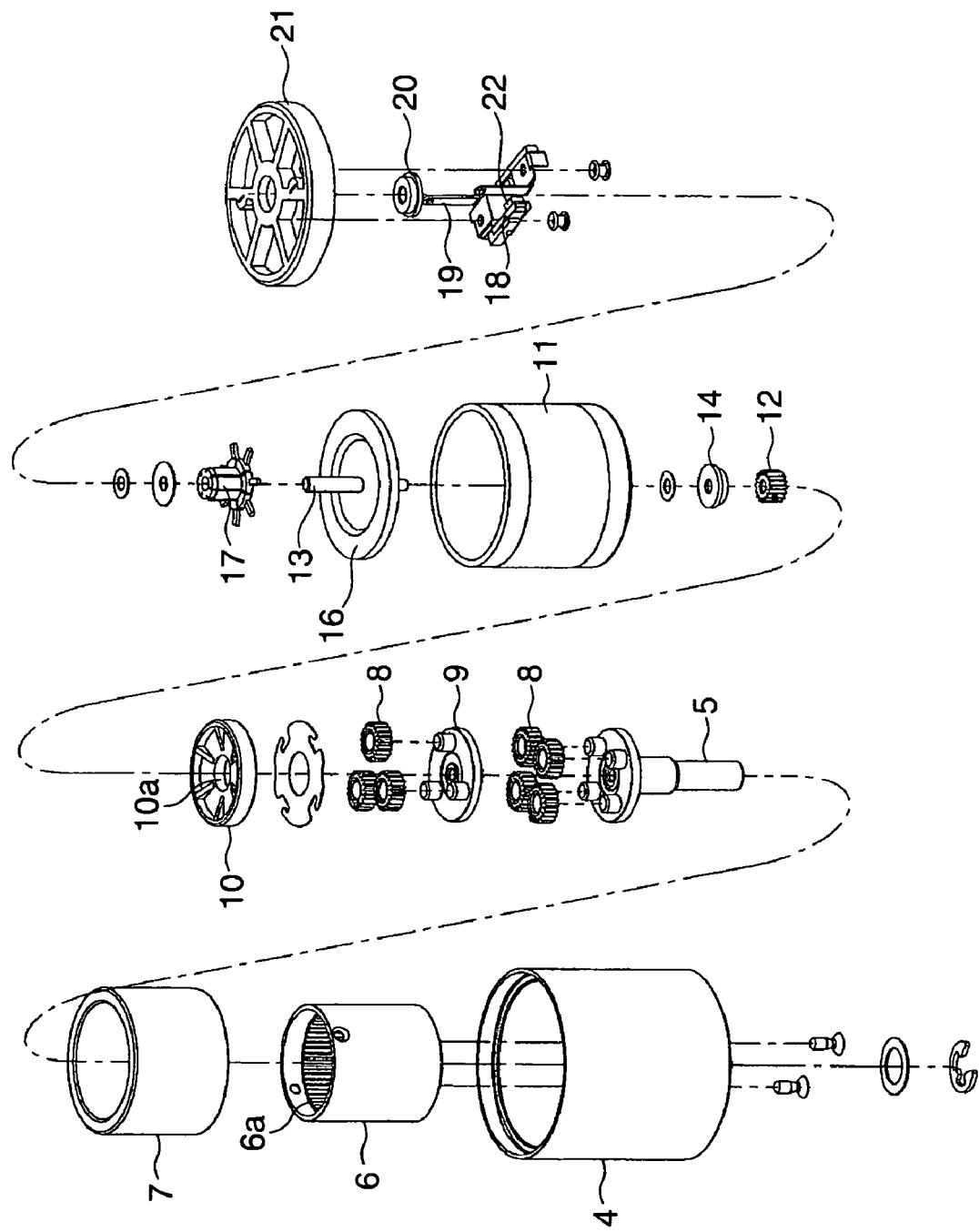
FIG. 7 is an exploded perspective view showing a coreless motor created by the present inventor on which this invention is based.

The basic construction of this coreless motor with built-in speed reducer is described with reference to FIG. 7 to 9. FIG. 7 shows the coreless motor in exploded perspective view, FIG. 8 shows in perspective view the coreless motor in a state being assembled, and FIG. 9 shows in cross section the coreless motor in a state after assembled.

Figure 8:
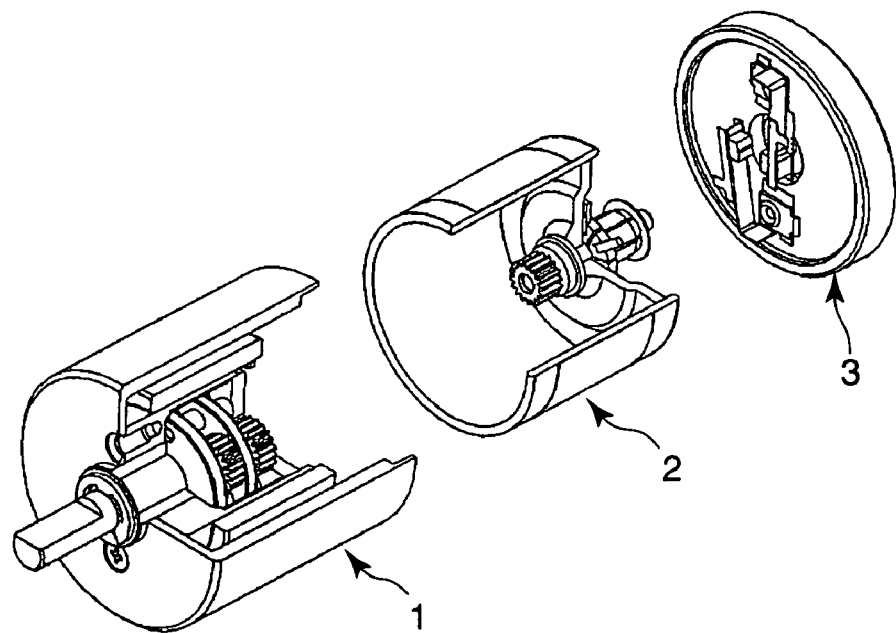
FIG. 8 is an exploded perspective view showing the coreless motor in a state during the assembly thereof.

Referring to FIGS. 7 and 8, a cylindrical magnet 7 (field magnet) is fitted onto an inner yoke 6 made of a magnetic material and formed with an internal gear 6a, and an outer cylinder 4 is fitted onto the magnet 7, thereby obtaining a field assembly. Then, an output shaft 5, a sun gear 9, and planetary gears 8 are incorporated into the field assembly, thereby completing an outer cylinder gear unit 1. Reference numeral 10 denotes an inner lid attached to the inner yoke 6 of the outer cylinder gear unit 1, and 12 denotes a pinion gear attached to a motor shaft 13. Reference numeral 16 denotes a circular plate attached to a cylindrical coil 11, and 17 denotes a commutator attached to the circular plate 16. The inner lid 10 is formed with a central hole 10a that additionally functions as a seat for an output-side bearing 14 for the motor shaft 13. The central hole 10a of the inner lid 10 is therefore required to have a center axis thereof accurately coincident with a center axis of a circular annular gap defined by an inner peripheral surface of the outer cylinder 4 and an outer peripheral surface of the magnet 7 into which the cylindrical coil 11 of a rotor unit 2 is subsequently incorporated. To this end, the internal gear 6 to which the inner lid 10 is attached, the magnet 7, and the outer cylinder 4 must be assembled with accuracy. In addition, the inner lid 10 and the bearing 14 are each required to have the accuracy of a single component part, such as sizes of and concentricity between outer and inner diameters.

The motor shaft 13 is rotatably supported at its anti-output side end by a bearing 20 attached to an outer lid 21. The bearing 20 and the outer lid 21 cooperate with a brush unit comprised of brush springs 18, terminals 19, and brushes 22 to constitute an outer lid unit 3 attached to the outer cylinder gear unit 1. The outer lid unit 3 and the outer cylinder 4 are required to have not only assembly accuracy but also component part accuracy such as concentricity between inner diameter of the outer cylinder 4 and inner diameter of an outer lid-mounted portion of the outer cylinder 4, concentricity between outer diameter of the outer lid 21 and inner diameter of a bearing-mounted portion of the outer lid 21, and concentricity between outer and inner diameters of the bearing 20.

Figure 9:
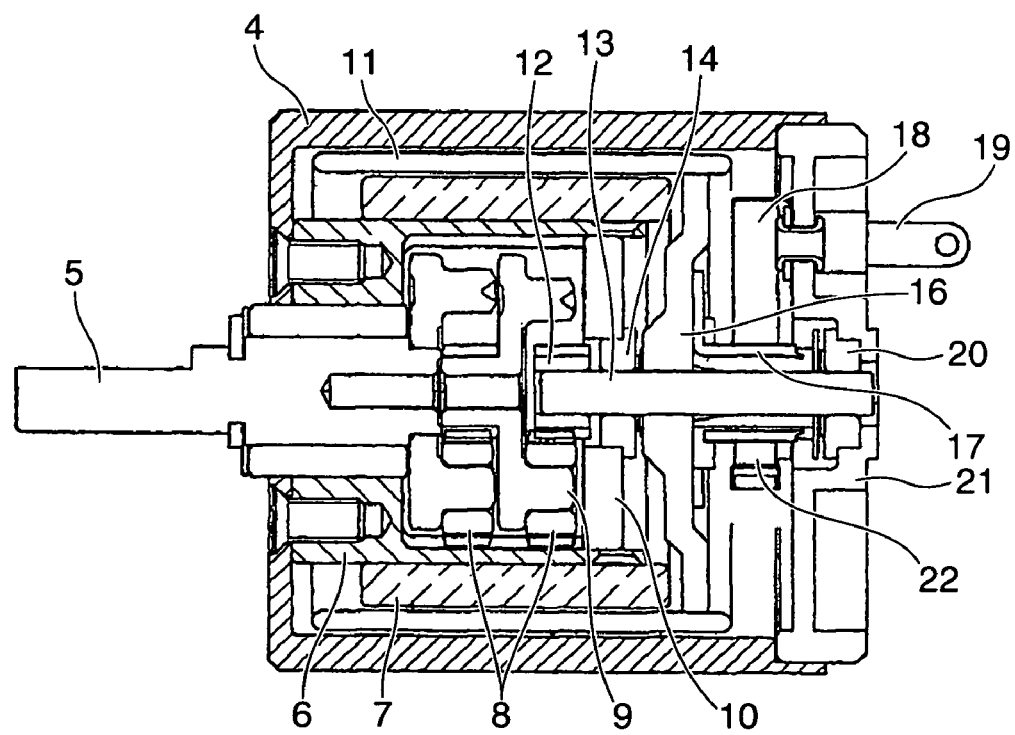
FIG. 9 is a section view showing the coreless motor of FIG. 7 in a state after the assembly thereof.

The coreless motor assembled as shown in FIG. 9 is configured such that the rotor coil 11 rotates inside the gap defined by the outer peripheral surface of the magnet 7 and the inner peripheral surface of the outer cylinder 4. Thus, at least front- and rear-side bearings 14, 20 rotatably supporting the rotor shaft (motor shaft 13) are required to have their center axes accurately coincident with the center axis of the outer diameter of the magnet and the center axis of the inner diameter of the outer cylinder.

The above-described coreless motor with built-in speed reducer is able to be downsized, but requires a number of component parts interposed between the bearings, the magnet, and the outer cylinder and a number of assembly processes. Since the concentricity between the bearings, the magnet outer diameter, and the outer cylinder inner diameter is finally determined by accumulation of component part accuracies and assembly accuracies, the finished quality varies between coreless motors and the desired concentricity accuracy cannot be frequently satisfied.

To assemble the field assembly and the rotor unit with accuracy is one of the most important requirements for the coreless motor. To satisfy the requirement, the field assembly and the motor shaft or the bearings must accurately be assembled. In the coreless motor with built-in speed-reducer mechanism, however, it is difficult to assemble the field assembly and the motor shaft with the required accuracy because of a short distance between the motor shaft bearings and the presence of a number of component parts interposed between the field assembly and the motor shaft and a number of assembly processes.

Embodiment

The present inventor has created a coreless motor able to be downsized and eliminate the drawbacks of the coreless motor in FIGS. 7 to 9. In the following, a description will be given of a coreless motor according to one embodiment of this invention.

Figure 1:
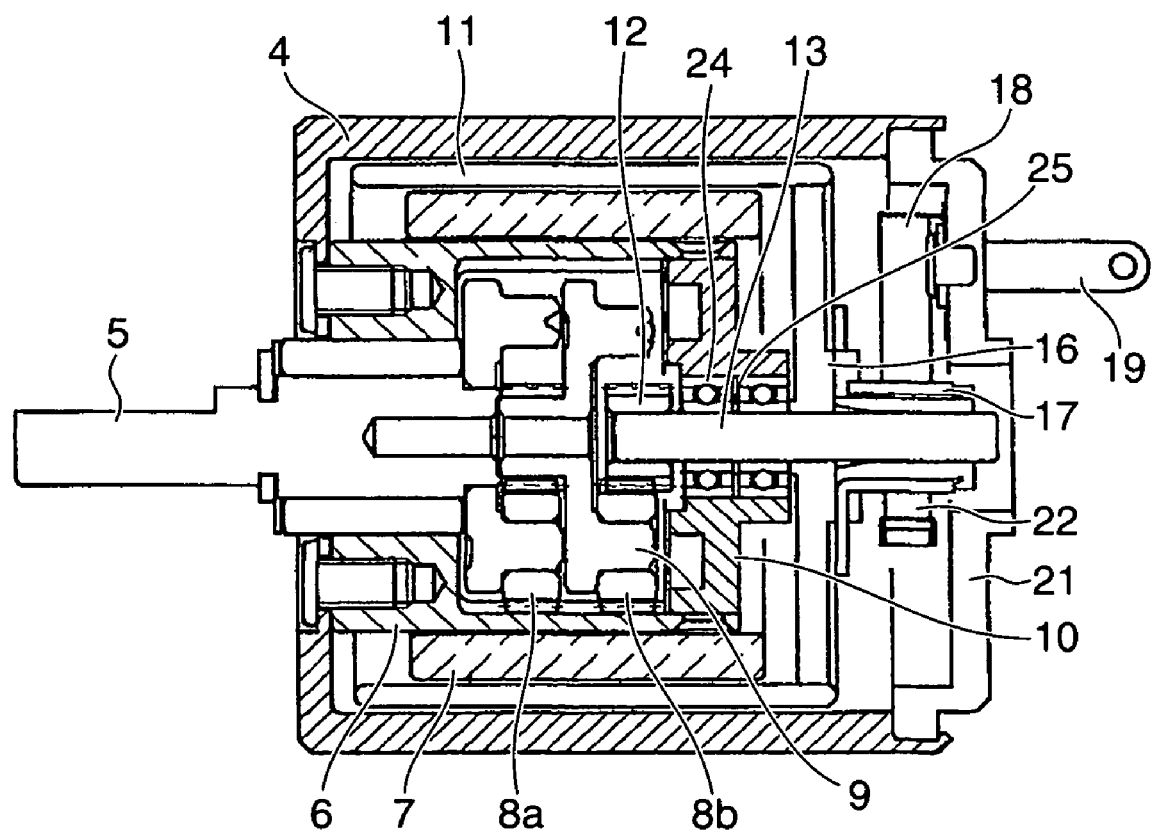
FIG. 1 is a section view showing the construction of a coreless motor according to one embodiment of this invention.
Figure 2:
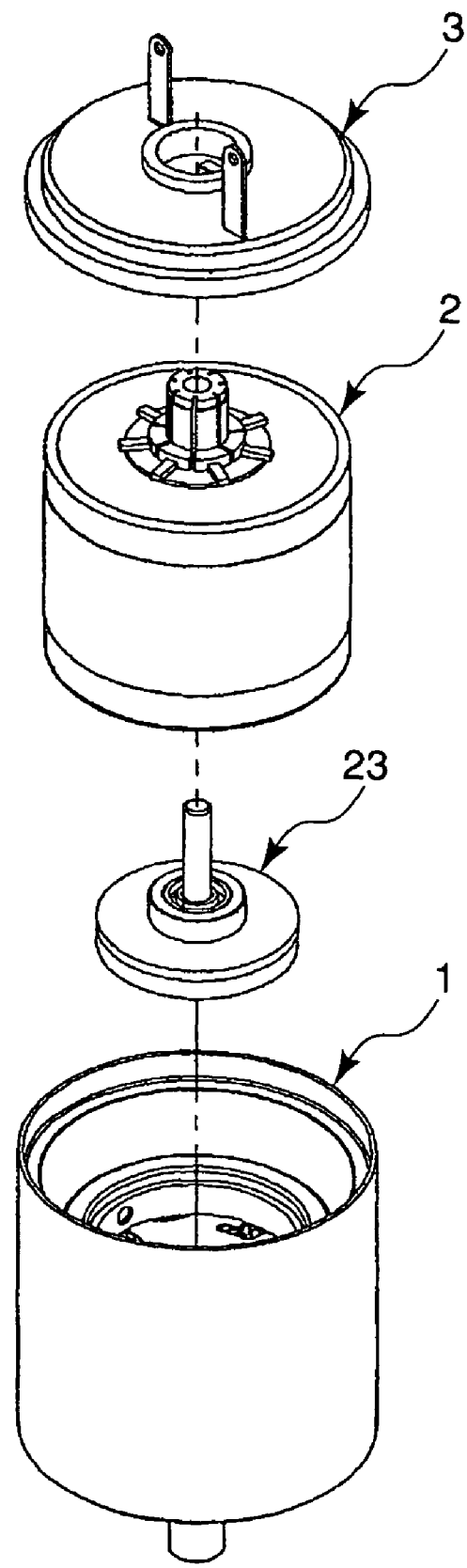
FIG. 2 is an exploded perspective view showing units of the coreless motor shown in FIG. 1.

FIGS. 1 to 6 show the construction of the coreless motor according to the one embodiment of this invention. Specifically, FIG. 1 shows the construction of the coreless motor in cross section, FIG. 2 shows respective units of the coreless motor in exploded perspective view, and FIGS. 3 to 6 show in exploded perspective views the constructions of an outer cylinder gear unit, a motor shaft unit, a rotor unit, and an outer lid unit of the coreless motor. Like parts which are the same as or similar to those shown in FIGS. 7 to 9 will be denoted by like reference numerals.

As shown in FIG. 1, the coreless motor of this embodiment is configured to have a planetary gear speed reducer disposed inside a magnet 7. As shown in FIG. 2, the coreless motor is constituted by and divided into four units, i.e., an outer cylinder gear unit 1, a motor shaft unit 23, a rotor unit 2, and an outer lid unit 3, whereby the coreless motor can easily be assembled as described below.

Figure 3:
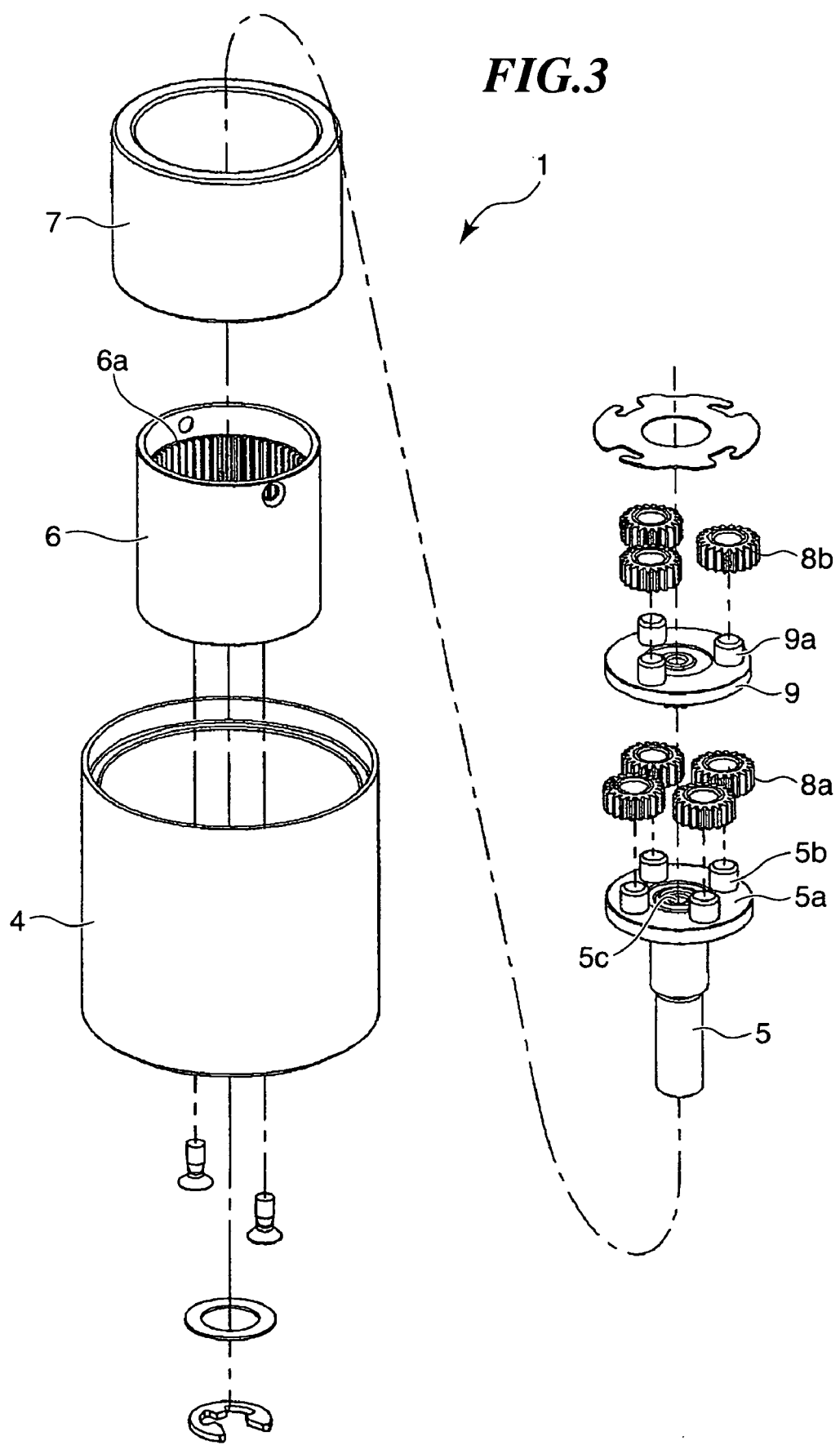
FIG. 3 is an exploded perspective view showing an outer cylinder gear unit of the coreless motor.

Referring to FIG. 3, the outer cylinder gear unit 1 of the coreless motor is comprised of a field assembly and a planetary gear unit incorporated into the field assembly. The planetary gear unit is comprised of an output shaft 5 having a flange 5a (i.e., a carrier of the planetary gear unit), planetary gears 5a rotatably supported by pins 5b formed on the flange 5a, a sun gear 9 rotatable relative to the output shaft 5 in unison with a rotary shaft fitted into a central hole 5c formed in the output shaft 5, and planetary gears 8b rotatably supported by pins 9a formed on the sun gear 9. The field assembly is comprised of a hollow cylindrical inner yoke 6 made of a magnetic material, a circular annular magnet 7 fitted onto an outer periphery of the inner yoke 6, and a hollow cylindrical outer cylinder 4 fitted onto an outer periphery of the magnet 7 and fixed to the inner yoke 6. An internal gear 6a in mesh with the planetary gears 8a, 8b of the planetary gear unit is formed on an inner peripheral surface of the inner yoke 6. After the field assembly is magnetized, the planetary gear unit comprised of the output shaft 5, the sun gear 9, and the planetary gears 5a, 8b is incorporated into the field assembly, whereby the assembly of the outer cylinder gear unit 1 is completed. The magnetizing of the filed assembly can be carried out after the planetary gear unit is incorporated into the field assembly. To stabilize a magnetic field, it is preferable that the planetary gears 8a, 8b be formed of a non-magnetic material.

Figure 4:
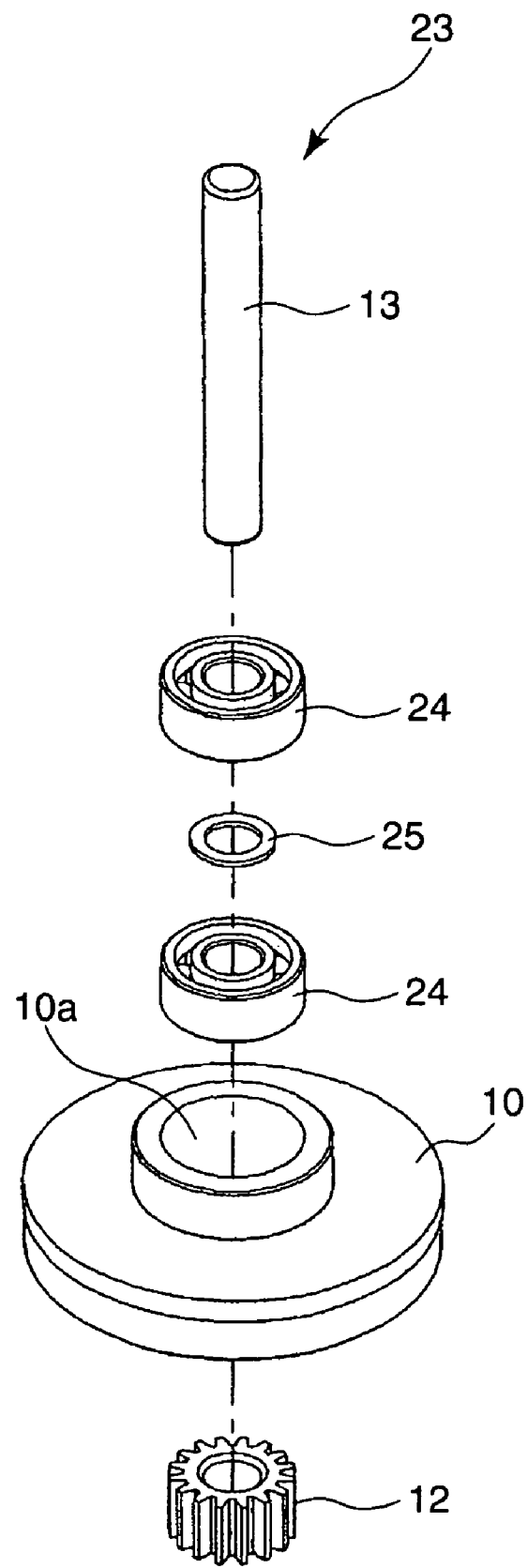
FIG. 4 is an exploded perspective view showing a motor shaft unit.

Referring to FIG. 4, the motor shaft unit 23 is comprised of an inner lid 10 fixed to the inner yoke 6 of the outer cylinder gear unit 1, a pair of bearings (a pair of ball bearings 24 in the illustrated example) juxtaposed axially of a motor shaft 13 and fixedly disposed in a central hole 10a of the inner lid 10 and adapted to rotatably support the motor shaft 13, a washer 25 interposed between the ball bearings 24, and a pinion gear 12 attached to an output-side of the motor shaft 13. The pinion gear 12 is in mesh with the planetary gears 8b of the planetary unit of the outer cylinder gear unit 1. Upon assembly of the motor unit 23, outer races of the ball bearings 24 are fixed with adhesive into the central hole 10a of the inner lid 10. At that time, the output-side bearing (lower ball bearing 24 in FIG. 4) is abutted at its outer race against a peripheral surface of the inner lid central hole 10a and the outer race of the bearing on the anti-output side (upper ball bearing 24 in FIG. 4) is pressurized toward a peripheral surface of the inner lid central hole 10a by using, e.g., a spring, not shown. As a result, the ball bearings 24 can be fixed in the inner lid central hole 10a coaxially therewith in a state applied with an appropriate precompression, and therefore the motor shaft 13 rotatably supported by the ball bearings 24 can rotate without any substantial runout.

Figure 5:
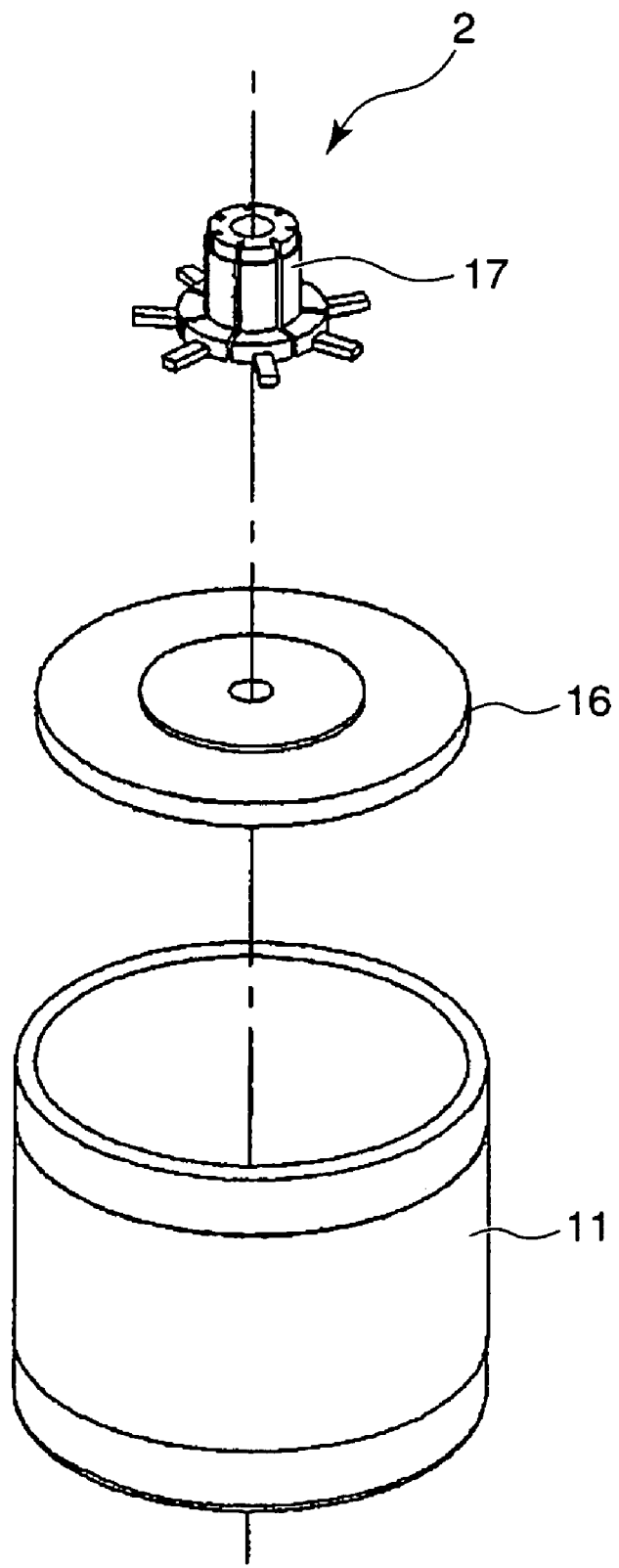
FIG. 5 is an exploded perspective view of a rotor unit.

Referring to FIG. 5, the rotor unit 2 includes a hollow cylindrical coil 11 interposed between the outer cylinder 4 and the magnet 7 of the outer cylinder gear unit, a circular plate 16 fixed to an open end surface of the circular plate 16, and a commutator 17 attached to the circular plate 16 and electrically connected with the coil 11. When energized, the coil 11 rotates relative to the magnet 7 around the motor shaft 13 of the motor shaft unit 23.

Figure 6:
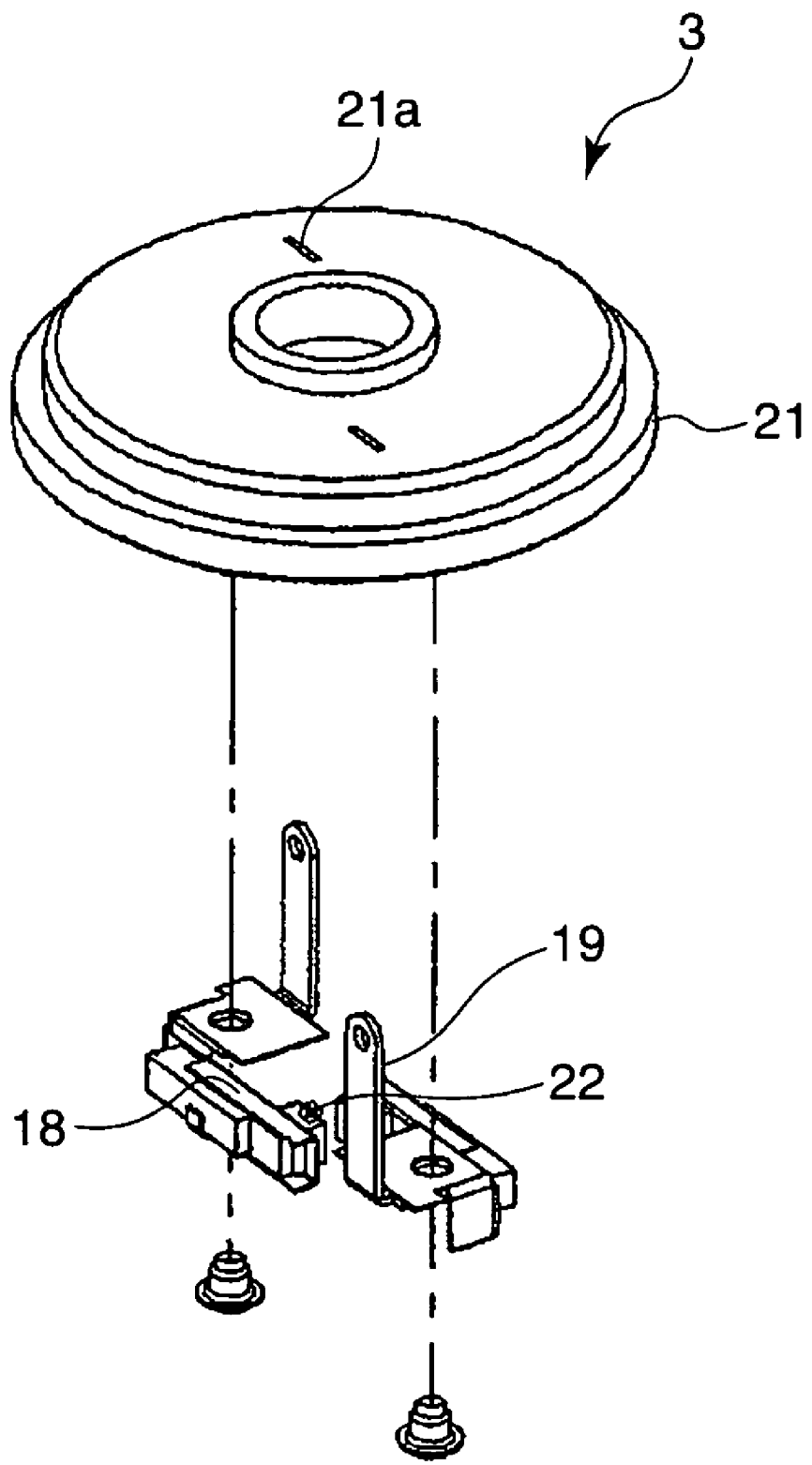
FIG. 6 is an exploded perspective view of an outer lid unit.

Referring to FIG. 6, the outer lid unit 3 includes an outer lid 21 fixed to the outer cylinder 4 of the outer cylinder gear unit 1, and a brush unit attached to the outer lid 21. The blush unit includes brushes 22 in contact with the commutator 17 of the rotor unit 2, brush springs 18 urging the brushes 22 toward the commutator 17, and terminals 19 inserted through terminal insertion holes 21a formed in the outer lid 21.

The above described four units are assembled with accuracy (see FIG. 1), whereby the coreless motor with speed reducer is completed.

Specifically, the cylindrical magnet 7 is attached to the outer periphery of the inner yoke 6, and the outer cylinder 4 is attached to the outer periphery of the magnet 7, whereby the field assembly is completed. After the field assembly is magnetized, the output shaft 5 and the speed-reducer mechanism (sun gear 9 and planetary gears 8a, 8b) are incorporated into the field assembly, whereby the outer cylinder gear unit 1 is completed. Next, the pair of ball bearings 24 is attached to the motor shaft 13 with the washer interposed between the bearings. Then, the outer races of the ball bearings 24 are fixed with adhesive to the central hole 10a of the inner lid 10, while the outer race of the ball bearing 24 on the output side of the motor shaft 13 is abutted against the inner lid central hole 10a and the outer race of the anti-output side ball bearing 24 is pressurized toward the inner lid central hole 10a, whereby the motor shaft unit 23 is completed. Next, the commutator 17 is attached to the circular plate 16, the coil 11 is electrically connected with the commutator 17, and the circular plate 16 is fixed to the coil 11 by adhesive, whereby the rotor unit 2 is completed. Next, the brush springs 18, the brushes 22, and the terminals 19 are attached to the outer lid 21, thereby completing the outer lid unit 3.

Then, the outer periphery of the inner lid 10 of the motor shaft unit 23 is incorporated into the inner periphery of the inner yoke 6 of the outer cylinder gear unit 1, and the coil 11 of the rotor unit 2 is incorporated into the gap between the outer cylinder 4 and the magnet 7. Further, the rotor unit 2 is attached to the motor shaft 13 so as to be rotated in unison with the motor shaft 13, and the outer lid unit 3 is attached to the rotor unit 2 and the outer cylinder 4, whereby the assembly of the coreless motor is completed.

As described above, the pair of ball bearings 24 is used as bearings, and the ball bearings 24 attached to the motor shaft 13 with the washer 25 interposed between the bearings 24 are incorporated into the central hole 10a of the inner lid 10 in a state that the outer races of the bearing 24 are applied with precompression, thereby being formed into the motor shaft unit 23. Then, in a state the motor shaft unit 23 is supported with accuracy relative to the field assembly of the outer cylinder gear unit 1, the inner lid 10 is incorporated into the inner periphery of the inner yoke 6.

The coreless motor described with reference to FIGS. 7 to 9 is downsized but has the field assembly and the motor shaft which are difficult to be assembled with accuracy because of the presence of a number of component parts interposed between the field assembly and the motor shaft and a number of assembly processes. On the other hand, according to this embodiment, since the motor shaft unit 23 is completed in advance and then directly assembled to the field assembly in the outer cylinder gear unit 1, the concentricity accuracy between the motor shaft 13, the magnet 7, and the outer cylinder 4 can easily be ensured. Thus, the coreless motor is easy to ensure the required concentricity between the motor shaft 13, the magnet 7, and the outer cylinder 4 and therefore has a structure easy to be assembled.

In the above, a case has been described in which the planetary gear speed reducer is adopted as a speed-reducer mechanism. Alternatively, an ordinary multi-stage spur gear speed reducer, a 3K-type paradox gear mechanism, a harmonic drive gear mechanism, etc., can be used. Also in that case, a coreless motor with speed-reducer mechanism whose characteristics are similar to those attained by the coreless motor with planetary gear speed reducer can be provided.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-131737, filed May 20, 2008, which is hereby incorporated by reference herein in its entirety.

What is claimed is:

1. A coreless motor comprising:
   (a) an outer cylinder gear unit including a planetary gear unit, an inner yoke formed with an internal gear in mesh with planetary gears of the planetary gear unit, a cylindrical magnet disposed on an outer periphery of the inner yoke, and an outer cylinder disposed on an outer periphery of the magnet;
   (b) a motor shaft unit including an inner lid adapted to be attached to the inner yoke, a motor shaft mounted with a pinion gear engageable with the planetary gears of the planetary gear unit when the inner lid is attached to the inner yoke, and a pair of bearings adapted to journal the motor shaft for rotation relative to the inner lid;
   (c) a rotor unit including a circular plate adapted to be attached to the motor shaft, a commutator attached to the circular plate, and a cylindrical coil fixed to the circular plate and electrically connected with the commutator; and
   (d) an outer lid unit including an outer lid adapted to be attached to the outer cylinder, and brushes fixed to the outer lid and adapted to be in contact with the commutator when the outer lid is attached to the outer cylinder,
   wherein the inner lid is attached to the inner yoke such that the pinion gear is in mesh with the planetary gears of the planetary gear unit, the circular plate is then attached to the motor shaft such that the coil is interposed between the magnet and the outer cylinder, and then the outer lid is attached to the outer cylinder.

2. The coreless motor according to claim 1, wherein the pair of bearings consists of a pair of ball bearings juxtaposed to each other along an axial direction of the motor shaft, and a washer is interposed between the pair of the ball bearings.

3. A coreless motor comprising:
(a) a motor shaft;
(b) a pinion gear attached to the motor shaft;
(c) a planetary gear unit having planetary gears in mesh with the pinion gear;
(d) an inner yoke formed with an internal gear in mesh with the planetary gears of the planetary gear unit;
(e) an inner lid fixed to the inner yoke;
(f) a pair of bearings adapted to journal the motor shaft on the inner lid;
(g) a cylindrical magnet disposed at an outer periphery of the inner yoke;
(h) an outer cylinder fixed to the inner yoke and disposed at an outer periphery of the magnet;
(i) a coil interposed between the magnet and the outer cylinder and adapted, when energized, to rotate around the motor shaft relative to the magnet;
(j) a commutator electrically connected with the coil;
(k) a circular plate attached with the commutator and fixed to the coil;
(l) brushes disposed in contact with the commutator; and
(m) an outer lid attached with the brushes and fixed to the outer cylinder.

4. The coreless motor according to claim 3, wherein the pair of bearings consists of a pair of ball bearings juxtaposed to each other along an axial direction of the motor shaft, and a washer is interposed between the pair of the ball bearings.

* * * * *